United States Patent
Okamoto (10) Patent No.: US 10,633,500 B2
(45) Date of Patent: Apr. 28, 2020

(54) MANUFACTURING METHOD AND INSPECTION METHOD OF TOW PREPREG

(71) Applicant: TOYOTA JIDOSHA KABUSHIKI KAISHA, Toyota-shi, Aichi-ken (JP)

(72) Inventor: Yohei Okamoto, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/817,361

(22) Filed: Nov. 20, 2017

(65) Prior Publication Data

US 2018/0163007 A1 Jun. 14, 2018

(30) Foreign Application Priority Data

Dec. 14, 2016 (JP) .................. 2016-241795

(51) Int. Cl.
| | |
|---|---|
| C08J 5/24 | (2006.01) |
| D01F 6/96 | (2006.01) |
| C08J 3/24 | (2006.01) |
| B29B 15/12 | (2006.01) |
| B29C 35/10 | (2006.01) |
| C08G 59/18 | (2006.01) |
| B29C 35/02 | (2006.01) |
| B29C 35/08 | (2006.01) |

(52) U.S. Cl.
CPC .............. *C08J 5/24* (2013.01); *B29B 15/122* (2013.01); *B29C 35/0266* (2013.01); *B29C 35/10* (2013.01); *C08G 59/18* (2013.01); *C08J 3/24* (2013.01); *D01F 6/96* (2013.01); *B29C 2035/0838* (2013.01); *C08J 2363/00* (2013.01)

(58) Field of Classification Search
CPC .. C08J 5/24; C08J 2363/00; C08J 3/24; D01F 6/96; B29B 15/122; B29C 35/10; B29C 35/0266; B29C 2035/0838; C08G 59/18
See application file for complete search history.

(56) References Cited

U.S. PATENT DOCUMENTS

| | | | |
|---|---|---|---|
| 7,999,561 B2 * | 8/2011 | Uozumi ................ | B29B 15/122 324/658 |
| 2009/0121728 A1 | 5/2009 | Uozumi et al. | |
| 2013/0327479 A1 | 12/2013 | Ichino et al. | |

FOREIGN PATENT DOCUMENTS

| | | |
|---|---|---|
| JP | H6-64107 A | 3/1994 |
| JP | 2013-103258 A | 5/2013 |
| JP | 2015-098556 A | 5/2015 |
| JP | 2016-43580 A | 4/2016 |
| WO | 2012/118208 A1 | 9/2012 |

OTHER PUBLICATIONS

Munhoz et al. "New technique of stereolithography to local curing in thermosensitive resins using CO2 laser" Rev. Metal. Madrid, 34(2), 1998 197-201 (Year: 1998).*

* cited by examiner

*Primary Examiner* — Robert S Walters, Jr.
(74) *Attorney, Agent, or Firm* — Sughrue Mion, PLLC

(57) ABSTRACT

A manufacturing method of a tow prepreg, comprising: an impregnation process of impregnating a reinforcement fiber with an anhydrous epoxy resin to obtain a tow prepreg; and a process of irradiating a specific surface of the tow prepreg with laser beam to cure the epoxy resin on the specific surface.

6 Claims, 8 Drawing Sheets

MANUFACTURING METHOD AND INSPECTION METHOD OF TOW PREPREG

CROSS-REFERENCE TO RELATED APPLICATIONS

The present application claims the priority based on Japanese Patent Application No. 2016-241795 filed on Dec. 14, 2016, the disclosure of which is hereby incorporated by reference in its entirety.

FIELD

The present disclosure relates to a tow prepreg.

BACKGROUND

JP 2015-98556A discloses a technique of impregnating a tow with an epoxy resin to obtain a tow prepreg.

RELATED ART

Using an anhydrous epoxy resin for the impregnation has such advantages that the material cost is low and a short heating time is sufficient for curing. Penetration of the moisture into the epoxy resin prior to curing is, on the other hand, likely to cause denaturation of the epoxy resin. This denaturation may cause a curing failure.

By taking into account the foregoing, when an anhydrous epoxy resin is used for impregnation, an object is to suppress denaturation of the epoxy resin with the moisture.

SUMMARY

According to one aspect of the disclosure, there is provided a manufacturing method of a tow prepreg, which comprises an impregnation process and a process of curing an epoxy resin. The impregnation process impregnates a reinforcement fiber with an anhydrous epoxy resin to obtain a tow prepreg. The process of curing the epoxy resin irradiates a specific surface of the tow prepreg with laser beam to cure the epoxy resin on the specific surface.

DESCRIPTION OF EMBODIMENTS

Figure 1:
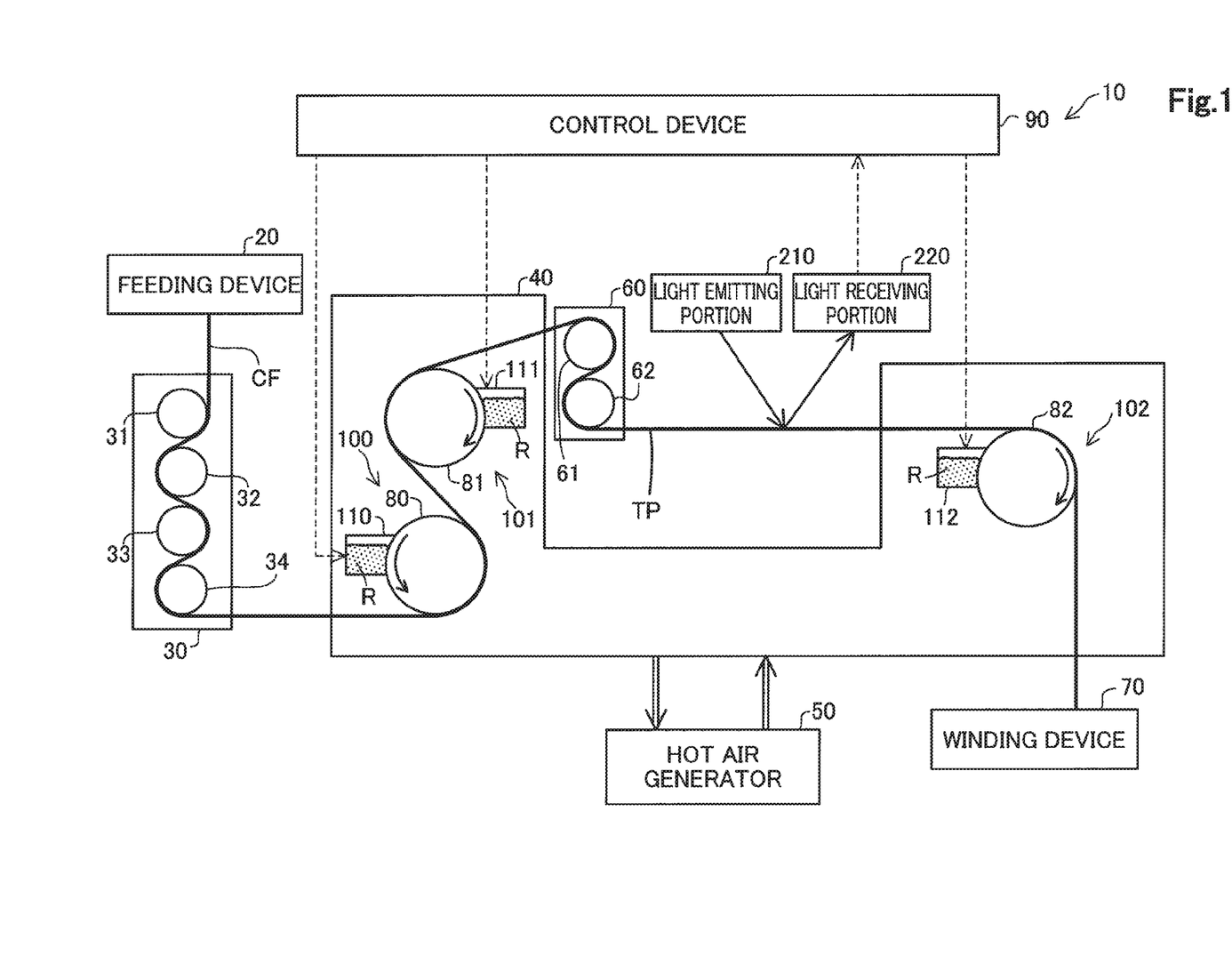
FIG. 1 is a schematic diagram illustrating a manufacturing apparatus of tow prepreg.

FIG. 1 illustrates the schematic configuration of a manufacturing apparatus of tow prepreg 10. The manufacturing apparatus 10 includes a feeding device 20, a width adjuster 30, a resin impregnation device 40, a hot air generator 50, a width adjuster 60, a winding device 70, a control device 90, a light emitting portion 210 and a light receiving portion 220.

The feeding device 20 is configured to feed a tow CF wound on a roller (not shown). The tow denotes a fiber bundle. Respective fibers constituting the tow CF according to this embodiment are carbon reinforcement fibers.

The width adjuster 30 includes a plurality of rollers 31 to 34. The plurality of rollers 31 to 34 are respectively configured to have a larger diameter on its center portion than diameters at respective ends. The tow CF passing through the rollers 31 to 34 is accordingly spread thinly. The thinly spread tow CF is likely to be readily impregnated with a resin R that is applied by resin appliers 100 and 101 (described later).

The resin impregnation device 40 includes resin appliers 100, 101 and 102 provided inside of its housing. The resin applier 100 includes a resin reservoir 110 and an application roller 80. The resin applier 101 includes a resin reservoir 111 and an application roller 81. The resin applier 102 includes a resin reservoir 112 and an application roller 82.

Each of the resin reservoirs 110, 111 and 112 is provided to store the resin R. The resin R is an uncured anhydrous epoxy resin. The resin R includes a curing agent. The curing agent according to this embodiment serves to cure the resin R at the temperature of approximately 60° C. or higher.

The application roller 80 is rotated to apply the resin R on a first surface of the tow CF. The application roller 81 is rotated to apply the resin R on a second surface of the tow CF. The application roller 81 is located downstream of the application roller 80 in a feeding direction. The application roller 82 will be described later.

The hot air generator 50 is configured to generate the hot air of approximately 50° C. and supply the hot air into the resin impregnation device 40. Supplying the hot air controls the temperatures of the resin R stored in the resin reservoirs 110, 111 and 112 to approximately 50° C. Such temperature control decreases the viscosity of the resin R, while avoiding the progress of curing by the curing agent. Decreasing the viscosity accelerates impregnation with the resin R applied on the first surface and the second surface.

The tow CF carried in the resin applier 100 is changed to a tow prepreg TP by the operations of the resin appliers 101 and 102 described above and is once carried out of the resin impregnation device 40. The carried-out tow prepreg TP is carried in the width adjuster 60.

The width adjuster 60 includes a plurality of rollers 61 and 62. The plurality of rollers 61 and 62 are respectively configured to have a smaller diameter on its center portion than diameters at respective ends. The tow prepreg TP passing through the rollers 61 and 62 accordingly has an increased thickness and a decreased width.

The light emitting portion 210 is configured to emit laser beam toward the tow prepreg TP carried out of the width adjuster 60. A first surface TP1 (shown in FIG. 5) of the tow prepreg TP is irradiated with the emitted laser beam. The first surface TP1 of the tow prepreg TP corresponds to the first surface of the tow CF. The first surface TP1 is also called specific surface. A second surface TP2 (shown in FIG. 5) of the tow prepreg TP corresponds to the second surface of the tow CF.

The light receiving portion 220 is configured to receive the light reflected by the first surface TP1 of the tow prepreg TP and input the received light as information of a reflectance spectrum into the control device 90. The functions of the laser beam and the reflectance spectrum will be described later. After irradiation with the laser beam, the tow prepreg TP is again carried in the resin impregnation device 40 and is fed to the resin applier 102.

The application roller 82 of the resin applier 102 serves to apply the resin R on the second surface TP2 of the tow prepreg TP. The resin applier 102 is, however, configured essentially not to perform application of the resin R and but to perform application of the resin R only in the case of insufficiency in impregnation amount by the resin appliers 100 and 101.

The winding device 70 is configured to wind the tow prepreg TP passing through the resin applier 102 onto a bobbin (not shown). The tow prepreg TP wound onto the bobbin is used for manufacturing a high-pressure tank. Manufacture of the high-pressure tank includes a process of heating the tow prepreg TP wound on a liner to approximately 150° C. This process cures the resin R and increases the strength of the tow prepreg TP. This provides the strength required for a component of the high-pressure tank.

The control device 90 is configured to obtain the reflectance spectrum from the light receiving portion 220 and sends control signals to the resin appliers 100, 101 and 102. The detailed operations of the control device 90 will be described later.

Figure 2:
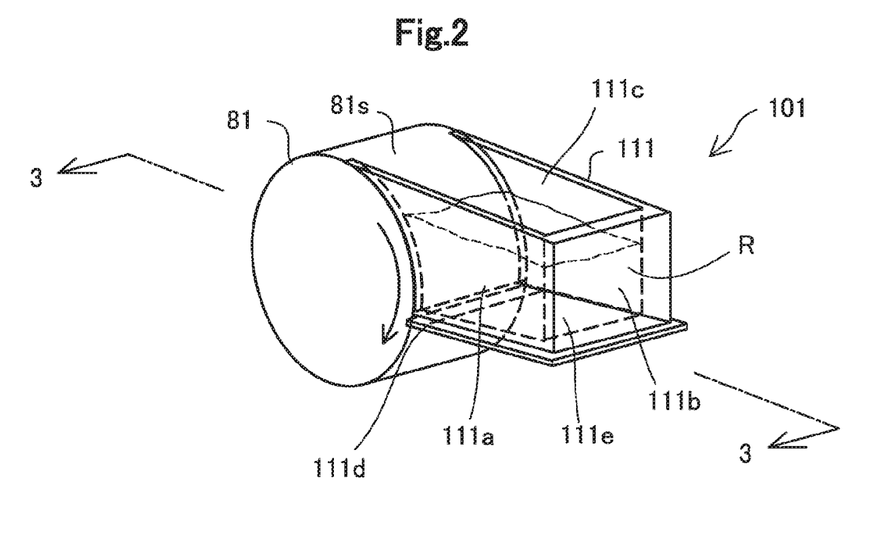
FIG. 2 is a perspective view illustrating a resin applier.

FIG. 2 is a perspective view illustrating the resin applier 101. The following describes controlling the amount of the resin applied by the resin appliers 100, 101 and 102. The resin appliers 100, 101 and 102 have practically identical configurations, and the following describes the resin applier 101 as a representative example. The resin applier 102 may, however, not perform application of the resin R depending on the conditions as described above. This point will be described later.

The resin applier 101 includes a blade 111d, in addition to the resin reservoir 111 and the application roller 81.

The resin reservoir 111 has an approximately hexahedral outer shape. The resin reservoir 111 has three of four side faces that are defined by a side plate 111a, a side plate 111c and a back plate 111b. The resin reservoir 111 is also provided with a bottom plate 111e at the bottom. The resin reservoir 111 further includes an upper face and the last one side face that are open.

The application roller 81 has a roller surface 81s. The application roller 81 is arranged to adjoin to the resin reservoir 111, such that the roller surface 81s is rotated along the open side face of the resin reservoir 111. This configuration causes a space for storing the resin to be defined by the two side plates 111a and 111b, the back plate 111b, the bottom plate 111e and the roller surface 81s. The resin R is supplied from this space onto the roller surface 81s and is accordingly applied onto the tow CF that is in contact with the roller surface 81s.

The blade 111d is placed above the bottom plate 111e. The blade 111d is arranged to be opposed to the roller surface 81s of the application roller 81 across a gap (also called blade gap G (shown in FIG. 3)). The thickness of the resin R and thereby the mass of the resin R adhering to the roller surface 81s may be regulated by adjusting the size of the blade gap G.

Figure 3:
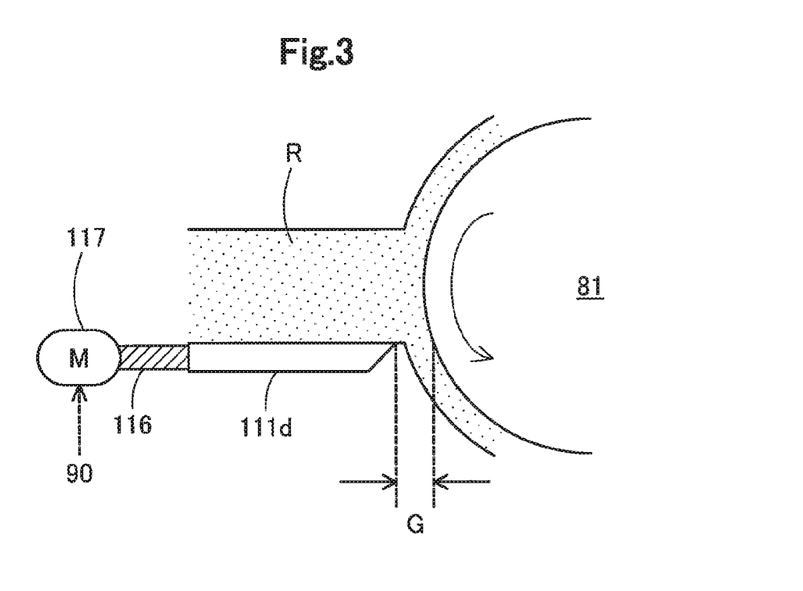
FIG. 3 is a sectional view taken on a line 3-3 in FIG. 2.

FIG. 3 illustrates part of a section taken along a line 3-3 in FIG. 2. The side plate 111a, the back plate 111b and the bottom plate 111e are omitted from the illustration of FIG. 3. In FIG. 3, a gap between the blade 111d and the application roller 81 is shown as the blade gap G.

The resin applier 101 includes a ball screw 116 and a motor 117. The ball screw 116 has one end that is connected with the motor 117 and the other end that is connected with the blade 111d. When the motor 117 is rotated, the ball screw 116 converts the rotational motion of the motor 117 into a linear motion and transmits the linear motion to the blade 111d. As a result, the blade 111d moves to change the blade gap G.

The amount of the resin R adhering to the surface of the application roller 81 increases with an increase in blade gap G. This results in increasing the amount of the resin R that is applied on the tow CF. The amount of the resin adhering to the surface of the application roller 81 decreases, on the other hand, with a decrease in blade gap G. This results in decreasing the amount of the resin R that is applied on the tow CF. The motor 117 is driven in response to a drive signal from the control device 90.

In adjustment of the blade gap G, in order to ensure the accuracy of adjustment, it is preferable to determine the size of the blade gap G. The size of the blade gap G may be actually measured by providing a position sensor or may be an estimated value.

In actual measurement of the size of the blade gap G, for example, the blade 111d may be mounted on a position control stage and a linear scale may be placed as the position sensor in the position control stage.

In estimation of the size of the blade gap G, a rotation amount of the motor 117 may be used. A relationship between the rotation amount of the motor 117 and the moving amount of the blade 111d may be determined and stored in advance. The size of the blade gap G may be estimated by actually measuring the rotation amount of the motor 117.

Figure 4:
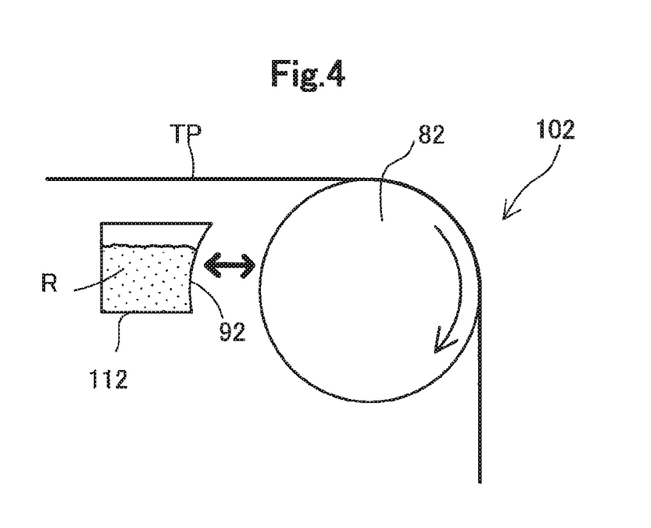
FIG. 4 is a diagram illustrating interruption of application of a resin by the resin applier.

FIG. 4 illustrates interruption of the application of the resin R by the resin applier 102. The resin applier 102 has a mechanism of setting the amount of the resin R applied on the surface of the application roller 81 to zero as described above. More specifically, the resin applier 102 is provided with the mechanism that moves the resin reservoir 112 to be away from the application roller 82 and thereby interrupts the supply of the resin R to the application roller 82.

The resin applier 102 is provided with a movable side wall 92 that serves to prevent leakage of the resin R when the supply of the resin R to the application roller 82 is interrupted. During application of the resin R onto the surface of the application roller 82, the side wall 92 is retreated not to interfere with the application. The move of the resin reservoir 112 described above and the move of the side wall 92 are controlled by control signals from the control device 90.

Figure 5:
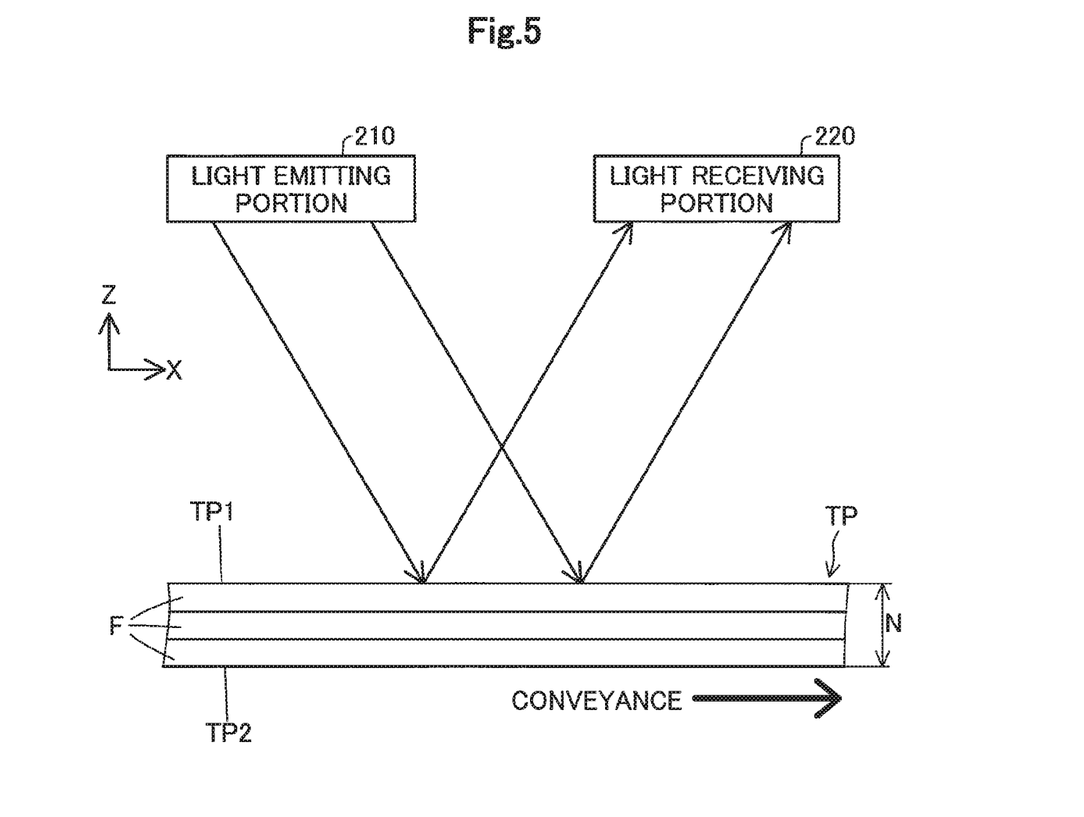
FIG. 5 is a diagram illustrating irradiation of a first surface of a tow prepreg with laser beam.

FIG. 5 illustrates irradiation of the first surface TP1 of the tow prepreg TP with laser beam. A side face of the tow prepreg TP is illustrated in FIG. 5. Unlike FIG. 1, a thickness N of the tow prepreg TP is explicitly shown in FIG. 5. Reinforcement fibers F constituting the tow prepreg TP are also shown in FIG. 5.

The laser beam emitted from the light emitting portion 210 has the wavelength of 600 nm to 800 nm. As shown in FIG. 5, a conveyance direction of the tow prepreg TP is defined as positive X direction, and a direction from the second surface TP2 to the first surface TP1 is defined as plus Z direction. The X direction and the Z direction are approximately orthogonal to each other. A Y direction is determined from the X direction and the Z direction in the right-hand system.

Figure 6:
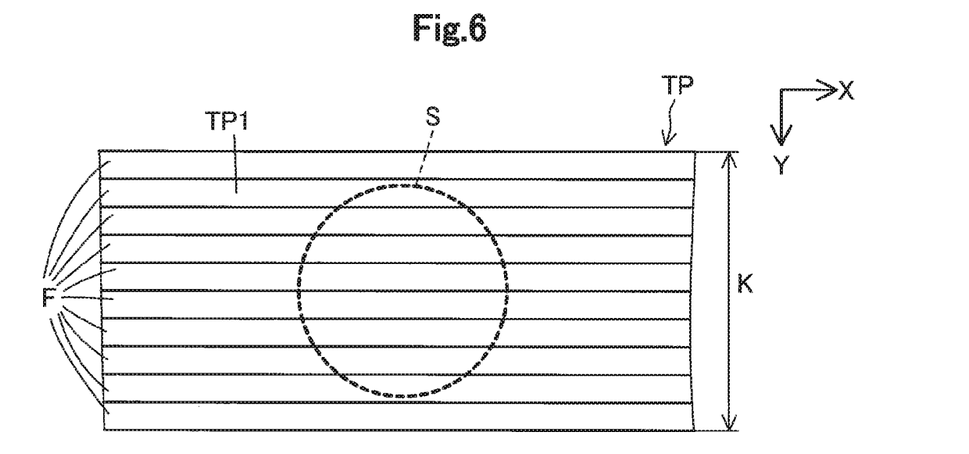
FIG. 6 is a diagram illustrating an approximate radiation range of laser beam.

FIG. 6 illustrates an approximate radiation range S of the laser beam. The radiation range S is in approximately circular shape. The radiation range S has a diameter that is slightly smaller than a width K of the tow prepreg TP.

Irradiation with the laser beam locally raises the temperature of the tow prepreg TP. A region of the highest temperature is in the radiation range S on the outermost surface of the first surface TP1. Heat is mainly transferred from this region in a direction of an X-Y plane, so as to raise the temperature out of the radiation range S on the outermost surface of the first surface TP1. As a result, the temperature of the first surface TP1 reaches or exceeds 60° C. over the entire width direction.

When the temperature of the first surface TP1 reaches or exceeds 60° C., curing by the curing agent proceeds on the first surface TP1. As a result, the tow prepreg TP carried in the resin applier 102 has the cured first surface TP1.

The cured first surface TP1 prevents the moisture in the atmosphere from penetrating through the first surface TP1 into the tow prepreg TP. The anhydrous epoxy resin is denatured by reaction with the moisture prior to curing. Such denaturation may cause a curing failure in the process of manufacturing the high-pressure tank. The configuration of preventing penetration of the moisture through the first surface TP1 that occupies almost half the surface area of the tow prepreg TP delays the progress of such denaturation.

The remaining part of the tow prepreg TP other than the first surface TP1, i.e., the second surface TP2 and inside of the tow prepreg TP is, on the other hand, hardly cured. This leaves the sufficient flexibility of the tow prepreg TP as a whole and thereby enables the tow prepreg TP to be wound on the bobbin by the winding device 70.

The resin applier 102 is configured to apply the resin R not on the first surface TP1 but on the second surface TP2. This is because impregnation with the resin R does not proceed by application of the resin R on the cured first surface TP1.

Figure 7:
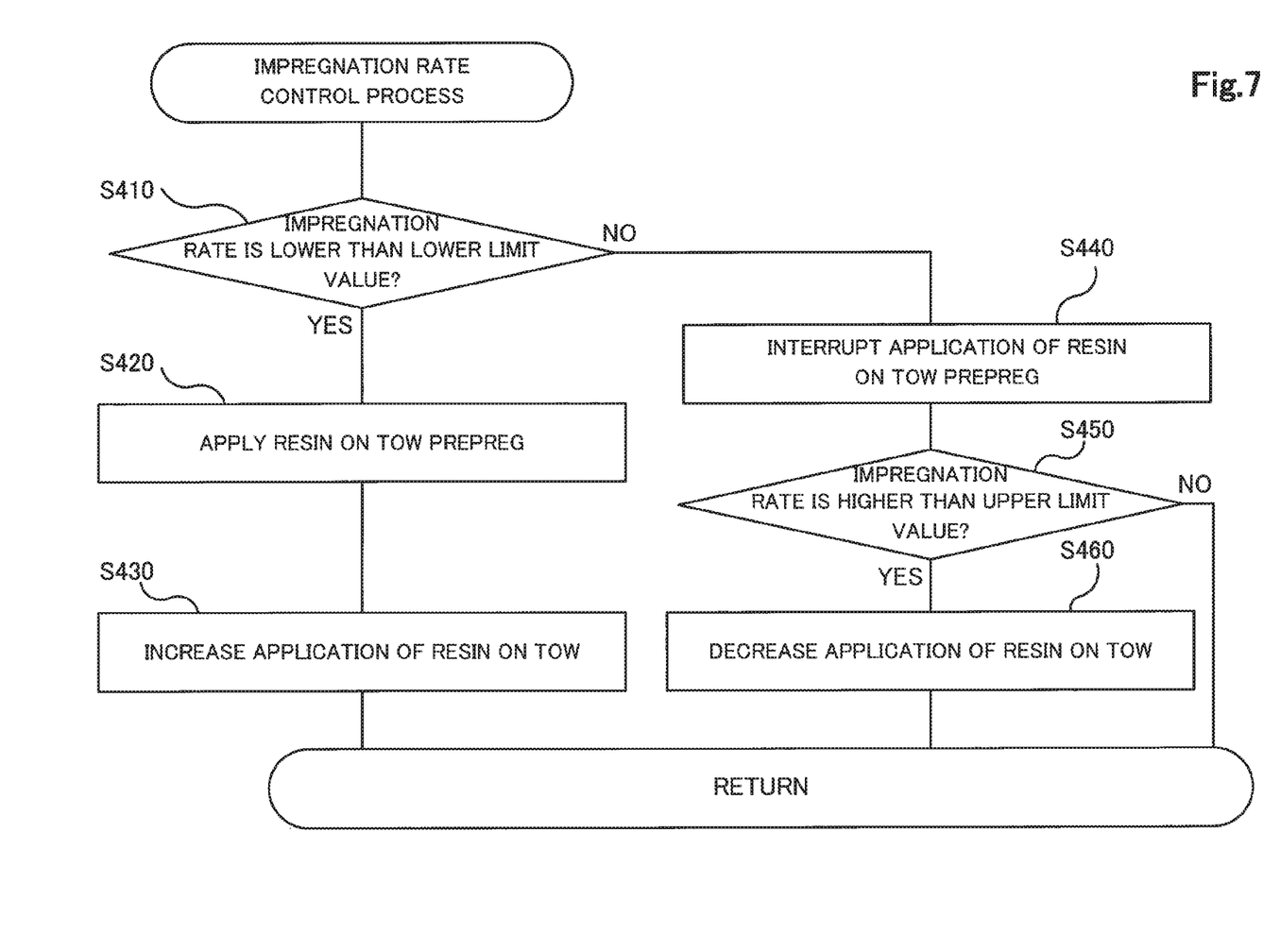
FIG. 7 is a flowchart showing an impregnation rate control process.

FIG. 7 is a flowchart showing an impregnation rate control process. The impregnation rate control process is repeatedly performed by the control device 90 during manufacture of the tow prepreg TP by the manufacturing apparatus 10.

The control device 90 first estimates whether an impregnation rate is lower than a lower limit value (S410). The impregnation rate herein denotes a value obtained by dividing the mass of the resin included in the tow prepreg TP by the entire mass of the tow prepreg TP. The lower limit value herein denotes a lower limit value of an appropriate range of the impregnation rate. The lower limit value and an upper limit value of the appropriate range are determined in advance by experiment. The following describes a procedure of obtaining the impregnation rate.

Figure 8:
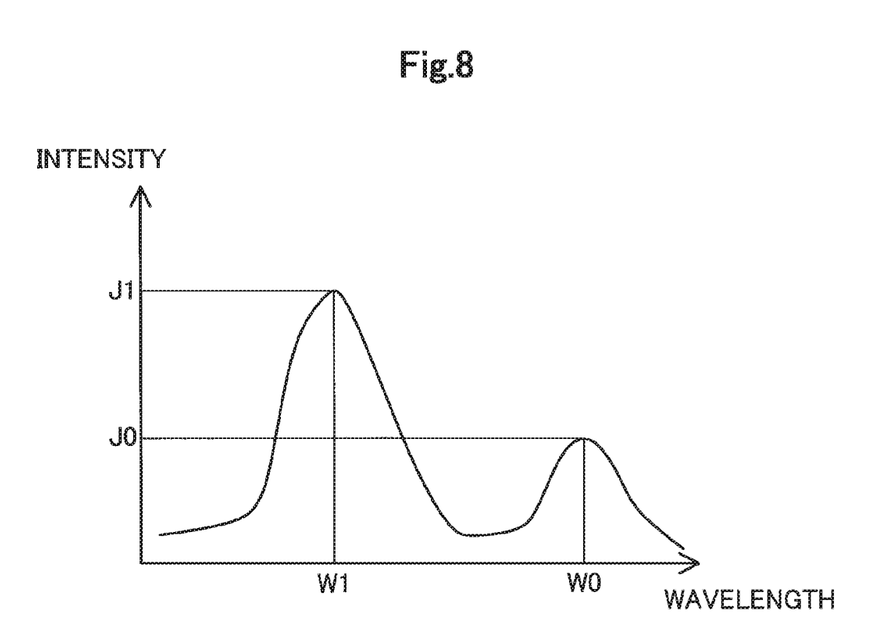
FIG. 8 is a graph showing a reflectance spectrum received by a light receiving portion.

FIG. 8 is a graph illustrating a reflectance spectrum received by the light receiving portion 220, with the intensity as ordinate and the wavelength as abscissa. As shown in FIG. 8, there are peaks at a wavelength W1 and at a wavelength W0. The intensity at the wavelength W1 is called intensity J1, and the intensity at the wavelength W0 is called intensity J0.

According to this embodiment, the intensity J1 is correlated to the mass of the epoxy resin included in the tow prepreg TP. The intensity J0 is correlated to the mass of the reinforcement fibers F of the tow prepreg TP. The impregnation rate may thus be estimated by obtaining an intensity ratio J1/J0. More specifically, a large number of correspondence relationships between the intensity ratio J1/J0 and the impregnation rate measured by another technique are obtained by experiment, so that the impregnation rate may be estimated from the intensity ratio J1/J0.

Another technique of measuring the impregnation rate may perform impregnation with grasping the mass of a predetermined length of the tow CF and the mass of the resin R applied on this tow CF. This technique may be performed by using the manufacturing apparatus 10 or may be performed manually.

At S410, the control device 90 determines whether the value of the intensity ratio J1/J0 indicates the impregnation rate lower than the lower limit value of the appropriate range.

When the impregnation rate is lower than the lower limit value of the appropriate range (S410: YES), the control device 90 sends a control signal to the resin applier 102 to apply the resin R on the second surface TP2 of the tow prepreg TP (S420). The control device 90 subsequently controls the resin appliers 100 and 101 to increase the amount of application of the resin R on the tow CF (S430).

When the impregnation rate is equal to or higher than the lower limit value of the appropriate range (S410: NO), on the other hand, the control device 90 interrupts the application of the resin R by the resin applier 102 (S440). When the application by the resin applier 102 has already been interrupted on the occasion of negative answer at S410, the processing of S440 is to be skipped.

The control device 90 subsequently estimates whether the impregnation rate is higher than an upper limit value (S450). The upper limit value herein denotes a value that is larger than the lower limit value of the appropriate range and is smaller than the upper limit value of the appropriate range. The upper limit value of the appropriate range is not employed as the criterion at S450, since the impregnation rate higher than the upper limit value of the appropriate range provides a defective product.

The lower limit value of the appropriate range is, on the other hand, employed as the criterion at S410. Even when the impregnation rate is lower than the lower limit value of the appropriate range, increasing the impregnation rate by using the resin applier 102 avoids providing a defective product.

When the impregnation rate is higher than the upper limit value (S450: YES), the control device 90 controls the resin appliers 100 and 101 to decrease the amount of application of the resin R on the tow CF (S460).

When the impregnation rate is not higher than the upper limit value (S450: NO), on the other hand, the control device 90 returns to S410. The control device 90 also returns to S410 after completion of the processing at S430 or the processing at S460.

The embodiment described above advantageously provides three advantageous effects by using radiation of the laser beam. The first advantageous effect is to suppress the tow prepreg TP from being denatured with the moisture by curing the first surface TP1 as described above.

The second advantageous effect is to continuously grasp the impregnation rate by obtaining the spectrum of reflected light as described above. Furthermore, continuously grasping the impregnation rate enables the resin appliers 100, 101 and 102 to be controlled such that the impregnation rate is within the appropriate range.

The third advantageous effect is improvement of the productivity in filament winding. As described above, the tow prepreg TP is used for manufacture of the high-pressure tank. More specifically, the tow prepreg TP is wound on the outer circumference of a liner as a component of the high-pressure tank and is cured in a subsequent heating process. A known filament winding technique may be employed in this winding process.

The reinforcement fibers F constituting the tow prepreg TP are likely to include some defect. The defect herein denotes, for example, discontinuity of the reinforcement fiber F. The tow prepreg TP is configured by bundling a large number of reinforcement fibers F and is cured as described above. The reinforcement fibers F including some defect accordingly causes no practical problem with regard to the strength.

The presence of a defect on the surface of the tow prepreg TP may, however, cause the tow prepreg TP to be caught by a thread roller or the like used in filament winding. Such a catch of the prepreg TP may result in reducing the productivity.

As described above, according to the embodiment, the tow prepreg TP is arranged such that the first surface TP1 is in contact with the thread roller or the like where a catch of the prepreg TP is likely to occur. This is because a defect of the reinforcement fibers F on the first surface TP1 can be compensated by the cured resin.

The second advantageous effect and the third advantageous effect described above may also be obtained when a non-anhydrous epoxy resin is used according to another embodiment.

The disclosure is not limited to any of the embodiment and its modifications described above but may be implemented by a diversity of 35 configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

According to one aspect of the disclosure, there is provided a manufacturing method of a tow prepreg, which comprises an impregnation process and a process of curing an epoxy resin. The impregnation process impregnates a reinforcement fiber with an anhydrous epoxy resin to obtain a tow prepreg. The process of curing the epoxy resin irradiates a specific surface of the tow prepreg with laser beam to cure the epoxy resin on the specific surface. The configuration of this aspect causes the anhydrous epoxy resin to be cured on the specific surface and accordingly prevents penetration of the moisture through the specific surface into the tow prepreg.

The manufacturing method of the above aspect may further comprise a determination process and a process of applying the epoxy resin. The determination process may determine whether an impregnation rate of the epoxy resin in the tow prepreg obtained by the impregnation process is lower than a predetermined lower limit value. This determination may be based on a spectrum of reflected light of the laser beam. When the impregnation rate of the epoxy resin is lower than the lower limit value, the process of applying the epoxy resin may apply the epoxy resin on a rear face of the specific surface of the two prepreg. Even when the impregnation rate of the epoxy resin in the tow prepreg obtained by the impregnation process is lower than the lower limit value, the configuration of this aspect avoids a manufacturing failure.

The manufacturing method of the above aspect may further comprise another determination process. This determination process may determine whether an impregnation rate of the epoxy resin is higher than a predetermined upper limit value. This determination may be based on a spectrum of reflected light of the laser beam. When the impregnation rate of the epoxy resin is higher than the upper limit value, the impregnation process may decrease an amount of impregnation with the epoxy resin. The configuration of this aspect reduces manufacturing failures.

According to another aspect of the disclosure, there is provided an inspection method of a tow prepreg, which comprises an impregnation process, an irradiation process and a determination process. The impregnation process impregnates a reinforcement fiber with an epoxy resin to obtain a tow prepreg. The irradiation process irradiates a specific surface of the tow prepreg with laser beam. The determination process determines whether an impregnation rate of the epoxy resin is within a predetermined range. This determination is based on a spectrum of reflected light of the laser beam. The configuration of this aspect enables the amount of impregnation in the impregnation process to be continuously grasped.

The present disclosure may be implemented by various aspects other than those described above, for example, a manufacturing apparatus configured to implement the above method.

What is claimed:

1. A manufacturing method of a tow prepreg, comprising:
   an impregnation process of impregnating a reinforcement fiber with an anhydrous epoxy resin to obtain a tow prepreg having a first surface on a front side and a second surface on a back side;
   a process of irradiating only the first surface of the tow prepreg with a laser beam to cure the epoxy resin on the first surface to obtain a preliminarily cured tow prepreg in which the preliminarily cured tow prepreg retains flexibility to be wound, whereby denaturation of the anhydrous epoxy resin is suppressed, and
   winding the preliminarily cured tow prepreg.

2. The manufacturing method of the tow prepreg according to claim 1, further comprising:
   a process of determining whether an impregnation rate of the epoxy resin in the tow prepreg obtained by the impregnation process is lower than a predetermined lower limit value, based on a spectrum of reflected light of the laser beam; and
   a process of applying the epoxy resin on the second surface of the tow prepreg, when the impregnation rate of the epoxy resin is lower than the lower limit value.

3. The manufacturing method of the tow prepreg according to claim 1, further comprising:
   a process of determining whether an impregnation rate of the epoxy resin is higher than a predetermined upper limit value, based on a spectrum of reflected light of the laser beam, wherein
   when the impregnation rate of the epoxy resin is higher than the upper limit value, the impregnation process decreases an amount of impregnation with the epoxy resin.

4. An inspection method of a tow prepreg, comprising:
   an impregnation process of impregnating a reinforcement fiber with an epoxy resin to obtain a tow prepreg;
   a process of irradiating a specific surface of the tow prepreg with laser beam; and
   a process of determining whether an impregnation rate of the epoxy resin is within a predetermined range, based on an intensity ratio J1/J0,
   wherein a spectrum of reflected light of the laser beam includes wavelength W0 and W1,
   wherein the intensity J1 for wavelength W1 is correlated to the mass of the epoxy resin included in the tow prepreg, and
   the intensity of J0 for wavelength W0 is correlated to the mass of the reinforcement fibers of the tow prepreg.

5. The inspection method according to claim 4, further comprising:
   a process of applying the epoxy resin on a rear face of the specific surface of the tow prepreg, when the impregnation rate of the epoxy resin is lower than a lower limit value of the range.

6. The inspection method according to claim 4,
   wherein when the impregnation rate of the epoxy resin is higher than an upper limit value of the range, the impregnation process decreases an amount of impregnation with the epoxy resin.

* * * * *